Dec. 4, 1934.  A. R. THOMPSON  1,982,709
FRUIT AND VEGETABLE PEELER
Filed Dec. 6, 1927  2 Sheets-Sheet 1
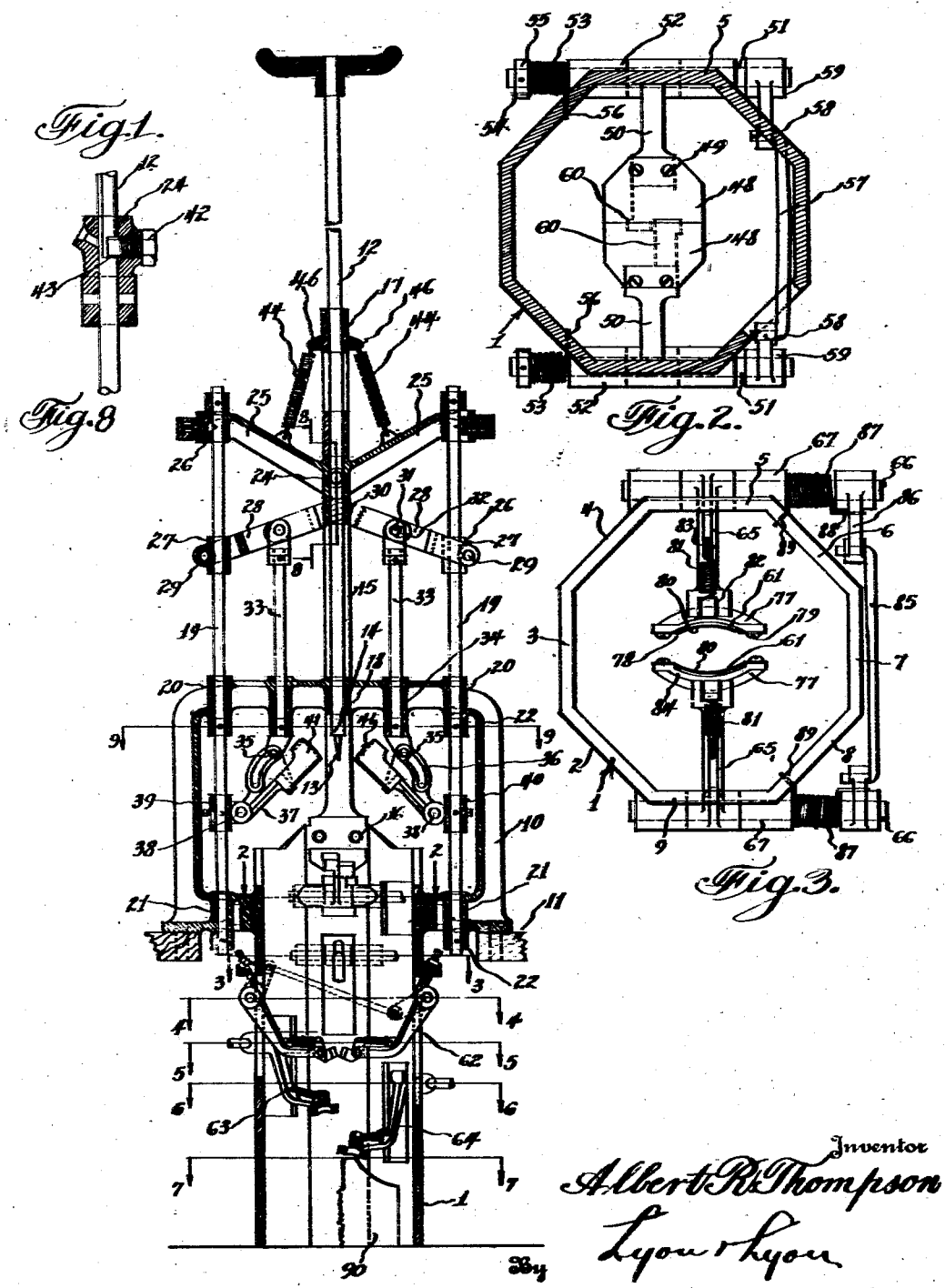

Dec. 4, 1934.  A. R. THOMPSON  1,982,709
FRUIT AND VEGETABLE PEELER
Filed Dec. 6, 1927   2 Sheets-Sheet 2
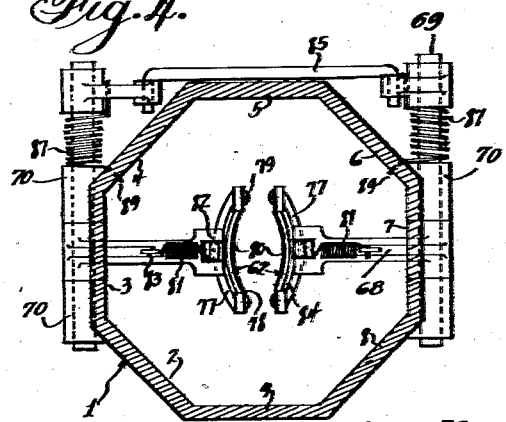
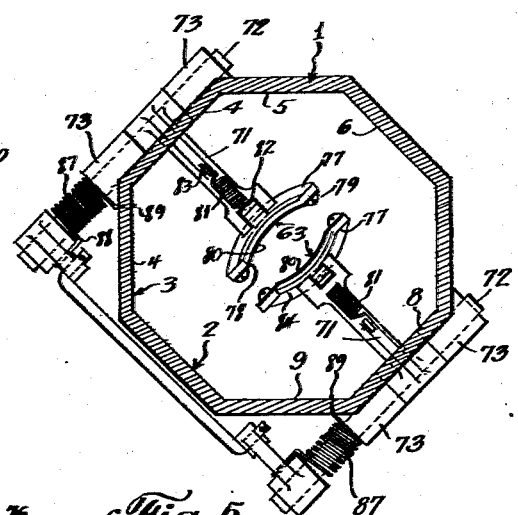
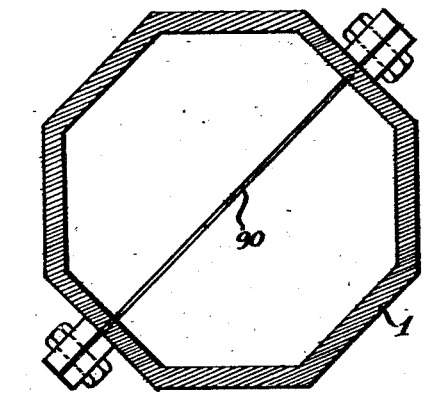
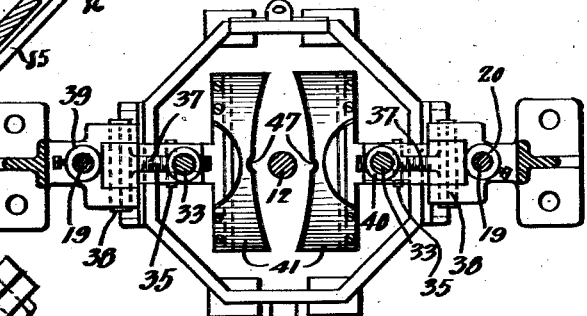
Inventor
Albert R. Thompson.
By Lyon & Lyon
Attorneys Patented Dec. 4, 1934

1,982,709

UNITED STATES PATENT OFFICE 1,982,709

FRUIT AND VEGETABLE PEELER

Albert R. Thompson, San Jose, Calif., assignor to Anderson-Barngrover Mfg. Co., San Jose, Calif., a corporation of California Application December 6, 1927, Serial No. 238,045

24 Claims. (Cl. 146—43)

This invention relates to fruit and vegetable peelers, and is more particularly related to a device adapted for use in removing peelings from fruits or vegetables such, for example, as pears, by moving the fruit or vegetable by a knife in a manner to remove a straight peel from the fruit or vegetable in a direction substantially parallel with the axis of the fruit or vegetable.

Many forms of fruit or vegetable peelers have heretofore been provided for removing the peelings from fruits and vegetables. These prior devices have for the most part depended upon a relative rotation of the peeling member or members and the article to be peeled during which relative rotation the article has been advanced relative to the peeling member so that a substantially spiral peel is removed from the article. This manner of peeling obviously necessitates a complicated machine of intricate design in order to effect the relative rotation of the fruit and peeling member while at the same time effecting a relative advancement of the fruit and peeling member.

An object of this invention is to provide a peeler of simple construction in which the article to be peeled is completely supported at one end and pushed relatively past the peeling members in a manner to avoid the use of a support for the forward end of the fruit, and enabling the peelers to cut from the article a straight peel in a line substantially parallel to the axis of said article.

Another object of this invention is to provide a machine for peeling fruit or vegetables which includes yieldable peeling means capable of cooperating with a pusher-stem operating as the sole support for the fruit and which are adapted to pass relatively along the outer surface of the article to be peeled and remove strips of peel longitudinally of said article.

Another object of this invention is to provide a fruit or vegetable peeler of improved general construction, and including simplified means for advancing the article to be peeled, and yieldable peeling means mounted in the path of said article cooperating with the same for cutting a straight peel from said article.

Another object of this invention is to provide a fruit or vegetable peeler including pairs of opposed, yieldably mounted self-centering knives, and means for advancing an article to be peeled between said pairs of knives.

Another object of this invention is to provide a machine for peeling fruits or vegetables, particularly pears, including means for advancing the pear, means for cutting the tip end from the pear, yieldable peeling means mounted in the path of the pear for cutting a peel longitudinally from said pear, and means for cutting the butt end away from the pear.

Another object of this invention is to provide a pear peeler including means for advancing the pear, means mounted in the path of the pear for cutting the butt end from said pear, yieldable peeling means mounted in the path of the pear for cutting a longitudinal peel from said pear, and means operably connected with said peeling means for determining the depth to which said peeling means cut into said pear in removing the peel.

Another object of this invention is to provide a pear peeler including a series of self-centering, yieldably mounted knives adapted to remove the entire peel from a pear, the knives of said series overlapping, and means for advancing the pear axially between said series of overlapping knives.

Other objects and advantages of this invention it is believed, will be apparent from the following detailed description of a preferred embodiment thereof, as illustrated in the accompanying drawings.

In the drawings:

Figure 1 is a sectional side elevation of a fruit and vegetable peeler embodying this invention.

Figure 2 is an end sectional view taken substantially on the line 2—2 of Figure 1.

Figure 3 is an end sectional view taken substantially on the line 3—3 of Figure 1.

Figure 4 is an end sectional view taken substantially on the line 4—4 of Figure 1.

Figure 5 is an end sectional view taken substantially on the line 5—5 of Figure 1.

Figure 6 is an end sectional view taken substantially on the line 6—6 of Figure 1.

Figure 7 is an end sectional view taken substantially on the line 7—7 of Figure 1.

Figure 8 is a fragmental sectional view illustrating the lock means embodied in this invention for locking the butt end cutting means to the fruit or vegetable advancing means.

Figure 9 is an end sectional view taken substantially on the line 9—9 of Figure 1.

In the preferred embodiment of this invention illustrated in the accompanying drawings, 1 indicates a base which is preferably constructed to provide a multiplicity of sides 2, 3, 4, 5, 6, 7, 8, and 9. Secured to the base 1 is a yoke 10. The yoke 10 may be secured to any suitable or desirable support such, for example, as a table top 11 so that the base 1 extends through the table top. The base 1 supports a multiplicity or series of peeling members within its interior in a manner which will hereinafter be particularly described.

Means are provided for advancing the fruit or vegetable to be peeled through the base 1 to engage the peeling members which means are preferably of the following construction: Pusher means in the form of a stem or spear 12 is provided having a prong 13 at its lower end which is separated from the shank of the spear 12 at a shoulder 14. The spear is slidably journaled in a bracket 15 secured to the base 1, as is indicated at 16. The spear 12 extends through a bearing sleeve 17 formed at the upper end of the bracket 15 and through a bearing sleeve 18 formed axially of the yoke 10. The fruit or vegetable to be peeled is impaled on the prong 13 of the spear 12 and the spear 12 is moved axially of the base 1 to move the fruit or vegetable by first a butt end removing means which cut the butt from the fruit or vegetable, then by a tip removing means which cut the tip away from the fruit or vegetable, and then by a multiplicity of angularly disposed pairs of yieldably urged peeling members which are self-centering in relation to the article being advanced between them and finally the fruit or vegetable is cut in half or in any other desired section by means of splitting means mounted at the bottom of the base 1. In the case of peeling a pear, the pear is impaled on the prong 13 of the spear 12 with its small end down so that the peeling means will more accurately follow the irregular contour of the pear in cutting the peel from the pear.

The means provided for cutting the butt end from the pear or other fruit or vegetable is preferably of the following construction: A pair of rods 19 are guided in the yoke 10 to permit the rods 19 to move longitudinally relative to the yoke 10. The rods 19 are guided in bearing sleeves 20 and 21 on the opposite sides of the yoke 10. Stop collars 22 are secured to the rods 19 below the bearing sleeves 20 and 21 to prevent the rods 19 from being withdrawn through the bearing sleeves 20 and 21. Secured on the shank of the spear 12 is a bracket 24 having outwardly extending arms 25 which are secured to the rods 19, as indicated at 26. Secured to the rods 19 are collars 27. Links 28 are pivotally secured at pins 29 to the collars 27 and are pivotally secured at their opposite ends to the bracket 24, as indicated at 30. Pivotally secured to the links 28 intermediate their length on pins 31, riding in slots 32, are rods 33 which extend through bearing sleeves 34 formed in the yoke 10. The rods 33 are pivotally secured at their lower end at pins 35. The pins 35 are mounted in arcuate slots 36 formed in arms 37. The arms 37 are pivotally supported on pins 38. The pins 38 pass through yokes 39 formed as an extension of collars 40 which are secured to the rods 19. The arms 37 carry curved knives 41 which are for the purpose of cutting away the butt end of the pear or fruit or vegetable. Means are provided for locking the shank of the spear 12 to the bracket 24, which means preferably comprise a pin 42 which is screw-threaded in the bracket 24 in position to pass into a slot 43 cut out of the shank of the spear 12. When the pin 42 is within the slot 43 of the shank of the spear 12, movement of the spear 12 moves the bracket 24 and rods 19 downwardly against the tendency of springs 44. The springs 44 are secured at one end to the arms 25 and at their opposite ends are secured to eyes 46 which extend outwardly from the bearing sleeve 17. The severing knives are actuated automatically in timed relation to the pusher-stem 12. For this reason they are preferably operatively connected with the stem. The downward movement of the bracket 24 causes the arms 37 to pivot upon the pins 38 and move the butt cutting knives 41 into position to cut the butt of the pear around the prong 13 of the spear 12. The knives 41 are arcuate in form and are provided with cut-outs 47 (see Fig. 9) to permit the knives to come together over the spear 12 and return to their starting position when the spear 12 is rotated to release the pin 42 from within the slot 43, to permit the spear 12 to be moved further downwardly through the machine to pass the article to be peeled by the tip removing means and the peeling means.

The tip removing means, that is, the means for severing the stem end of the fruit preferably comprise a pair of flat blades 48 which are secured, as indicated at 49, to arms 50. The arms 50 are secured to rods 51, which rods 51 are journaled in bearings 52 formed on the faces 5 and 9 of the base 1. Means are provided for yieldably urging the blades 48 together, which means preferably comprise springs 53 which are mounted upon the rods 51 and are secured at one end, as indicated at 54, to collars 55. The collars 55 are secured to the rods 51. The other ends 56 of the springs 53 are passed through bores formed in the base 1. In order to equalize the action of the blades 48, a connecting link 57 is provided which is pivotally secured at its ends 58 to arms 59 secured to the rods 51. Rider arms 60 extend outwardly from the arms 50 to ride upon the surface of the fruit or vegetable being peeled, after the knives 48 have operated to cut the tip from the fruit or vegetable to hold the knives 48 away from the remainder of the fruit or vegetable, as the fruit or vegetable is caused to pass between the knives 48 on the spear 12. The operation of the tip removing knives 48 is: The knives 48 are normally held in position inclined upwardly so that their cutting edges are spaced apart. The tip of the pear impaled upon the spear 12 passes between the knives 48 until the tip end of the pear engages the edges of the knives 48. Further movement downward of the pear causes the knives to be swung on their pivots 51 against the tension of springs 53, and the knives 48 are brought together to the position indicated in Figure 2, at which time the tip is cut from the pear. The pear moving further downward causes the knives 48 to swing past the horizontal position and the members 60 then ride on the periphery of the pear to hold the edges of the blades 48 away from the pear.

The peeling means for removing peel from the fruit or vegetable preferably comprise a multiplicity of pairs of peeling knives 61, 62, 63, and 64, all of which are preferably of the same construction, but are mounted in the base 1 in angular relation to cover the entire contour of the article to be peeled. The pair of peeling knives 61 is mounted on the arms 65 which are secured to rods 66 mounted in bearings 67 secured to the faces 5 and 9 of the base 1. The pair of peeling knives 62 is mounted on arms 68 which are secured to rods 69 journaled in bearings 70 secured to the faces 3 and 7 of the base 1. The pair of peeling knives 63 is similarly mounted on arms 71 secured to rods 72 journaled in bearings 73 secured to the faces 4 and 8 of the base 1. The pair of peeling knives 64 is supported by arms 74 which are secured to rods 75 journaled in bearings 76 of the faces 2 and 6 of the base 1.

The peeling knives 61, 62, 63 and 64 are all of the same construction so that the construction of only one of said knives will be described. Pivotally secured to each of the supporting arms is a knife carrier 77 upon which curved peeling knives 78 are secured, as indicated at 79. The curved peeling knives 78 are provided with sharp upper peeling edges 80. The peeling edges 80 are arcuate in form to substantially conform with the periphery of the fruit to be peeled. The length of the peeling edges 80 is such that the peeling edges of the successive sets of peeling knives overlap to insure that all of the peel will be removed from the fruit or vegetable in one pass of the fruit or vegetable through the machine. The carriers 77 are yieldably held in position to maintain the cutting edges 80 advanced in position to peel the fruit or vegetable by means of springs 81 which are secured at one end to the carriers 77, as indicated at 82, and at their opposite ends to the supporting arms, as indicated at 83.

In order to prevent the peeling knives as they press against the cheek of the fruit from cutting too deeply into the flesh of the fruit or vegetable, the peeling blades 78 are spaced only a distance sufficient to permit the peel of the correct thickness to pass behind said blades 78 and in front of the arcuate face 84 of the cutters 77.

Means are provided for centering the peeling blades 78 relative to the fruit or vegetable passing between them and for maintaining an equal pressure upon the peeling knives 78 in each pair of said peeling knives 78, which means includes for each pair of knives 61, 62, 63 and 64 a connecting link 85 which is connected at its ends to arms 86 secured to the rods 66 or 69 or 72 or 75. Mounted on the rods 66, 69, 72 and 75 are springs 87 which are secured at one end 88 to the arms 86 and are secured at their opposite ends 89 to the base 1. The springs 81 yieldably urge the peeling blades 78 toward the article to be peeled and the springs 87 center the fruit between the peeling blades of each pair by permitting the peeling blades of each pair to pivot an equal distance away from the longitudinal axis of the base 1 along which the article to be peeled is traveling. This self-centering and yieldable urging of the peeling knives is an important feature of this machine in that it enables the fruit to be peeled in a straight line from the tip to the butt end without necessitating the relative rotation of the article to be peeled and the peeling means. The self centering of the knives is accomplished in my invention due to the fact that the cooperating arms 65, 68, 71 or 84 of each pair of knives 61, 62, 63 or 64, hold and maintain the knives 61, 62, 63 or 64 of each pair equidistant from the center line of the machine regardless of the distance between the knives. This guides the fruit centrally through the machine in its peeling path. To accomplish this result a multiplicity of pairs of knives are required as a single pair could not prevent lateral displacement of the fruit from between the cutting edges.

In preparing most fruit for canning, it is desired that the fruit be split after it is peeled and for this purpose, I have provided a blade 90 secured in position at the bottom of the base 1 and onto which the fruit is impaled at the end of the stroke of the spear 12 to split the fruit in halves or such other sections as may be desired.

The operation of the pear peeler embodying this invention is as follows: The operator places an article to be peeled in the machine on the prong 13 of the spear 12. The handle of the spear 12 is rotated until the bracket 24 is locked to the shank of the spear 12 and the spear 12 is then pressed downwardly, carrying the fruit by the knives 41 which cut the butt away from the fruit and after this operation is completed, the spear 12 is rotated through 90° to release the bracket 24, which then returns to its starting position and on continued movement of the spear 12, the fruit is advanced by the tip removing knives 48 which cut the tip from the fruit. As the spear 12 is moved downwardly through the base 1, each of the pairs of knives 61, 62, 63, and 64 are brought successively into play to cut straight peels from the fruit or vegetable in a direction substantially parallel to the axis of the article being peeled. After the article has passed through the series or pairs of peeling knives, the same is impaled upon the splitting knife 90 which splits the article either in halves or in such sections as may be desired, depending upon the number of such splitting knives employed.

Having fully described my invention, it is to be understood that I do not wish to be limited to the details herein set forth, but my invention is of the full scope of the appended claims.

I claim:

1. In a device of the class described, the combination of means for holding a fruit to be peeled, a pair of diametrically opposed peeling members, means for advancing the holding member to pass the article between the peeling members, each of the peeling members including a knife carrier, a curved peeling knife secured to the knife carrier, means for determining the depth of cut of the knife, means for pivotally supporting the knife carrier, and means for yieldably connecting together the knife carriers of the diametrically opposed knives.

2. In a device of the class described, the combination of a spear on which a pear to be peeled is impaled at the stem end, means for advancing the spear through a straight path, means for cutting the butt from the pear, including means operatively connected with the spear advancing means for actuating the butt removing means, a plurality of sets of peeling members yieldably mounted on opposed sides of the path of the pear, the sets being mounted in spaced relation along the path of the pear, and means mounted in the path of the pear for trimming the tip end of the pear.

3. In a device of the class described, the combination of means upon which a pear is adapted to be impaled at its stem end, means for moving the spear through a straight line path, a plurality of sets of curved self-centering peeling knives mounted in spaced relation along the path of the fruit formed by the advancement of the spear in a straight line path, means for yieldingly connecting the peeling knives of each pair, and the peeling members including arcuate knives, each knife of which is adapted to conform to a portion of the curved periphery of the pear.

4. In a device of the class described, the combination of means upon which a fruit is adapted to be impaled, means for advancing the said impaling means through a predetermined straight line path, a plurality of pairs of diametrically opposed self-centering peeling members mounted in spaced relation along the path traversed by the fruit, the peeling members being positioned at different angles along the path of the fruit to remove the entire peel from the surface of the fruit as the fruit traverses the path, means for yieldingly connecting together the peeling members of each pair.

5. In a device of the class described, the combination of means upon which a fruit is adapted to be impaled, means for advancing the said impaling means through a predetermined path, a plurality of pairs of diametrically opposed peeling members mounted in spaced relation along the path traversed by the fruit, the peeling members being positioned at different angles along the path of the fruit to remove the entire peel from the surface of the fruit as the fruit traverses the path, and means for yieldably connecting peeling members of each pair together to enable said peeling members to move so that each peeling member follows along the irregular curvature of the fruit being peeled.

6. In a device of the class described, the combination of means upon which a fruit to be peeled is adapted to be impaled, means for advancing the impaling means through a predetermined path, means mounted in the path of the fruit and adapted to be actuated to trim the butt end of the fruit, a plurality of pairs of yieldably connected diametrically opposed peeling members mounted in spaced relation along the path of the fruit, and a pair of diametrically opposed yieldably connected tip-trimming members mounted in the path of the fruit for trimming the tip of the fruit.

7. In a fruit peeling machine, the combination of peeling mechanism, cutting means located to one side of the peeling mechanism for cutting off the end of the fruit, a holding device for holding the fruit to present the same to the cutting means, and means for moving the holding device to bring the fruit thereafter into alinement with the peeling mechanism.

8. In a fruit peeling machine, the combination of peeling mechanism, cutting means located to one side of the peeling mechanism for cutting off the end of the fruit, a holding device for holding the fruit to present the same to the cutting means, means for moving the holding device to bring the fruit thereafter into alinement with the peeling mechanism, and means for advancing the fruit thereafter past the peeling mechanism.

9. In a fruit peeling machine, the combination of a frame, a pusher-stem guided to move longitudinally in said frame and having an impaling prong at its forward end, a pair of opposed severing knives movably mounted respectively on opposite sides of the path of movement of the fruit when advanced by the stem, and means operatively connecting the pusher stem with the severing knives for actuating the same to swing inwardly and sever the end of the fruit adjacent to the prong.

10. In a fruit peeling machine, the combination of a frame, a pusher-stem guided to move longitudinally in said frame and having an impaling prong at its forward end, a pair of opposed severing knives pivotally mounted respectively on opposed sides of the path of movement of the fruit and disposed in an inclined position, so that the edges of said knives approach each other when the knives are swung on their pivots, and automatic means for actuating the knives to swing inwardly in timed relation to the stem, to sever the end of the fruit adjacent the prong, when the pusher-stem is advanced.

11. In a fruit peeling machine, the combination of a frame, a pusher-stem guided to move longitudinally in said frame and having an impaling prong at its forward end, a pair of opposed severing knives pivotally mounted respectively on opposed sides of the path of movement of the fruit and disposed in an inclined position so that the edges of said knives approach each other when the knives are swung on their pivots, and automatic means for actuating the knives in timed relation to the stem, to swing inwardly and sever the ends of the fruit adjacent the prong when the pusher-stem is advanced, the adjacent ends of said knives having oppositely disposed recesses cooperating to provide clearance for the said prong, when the knives are actuated.

12. In a fruit peeling machine, the combination of a frame, a pusher-stem guided to move vertically downward in said frame, having an impaling prong at its forward end for completely supporting the fruit from above, severing means for severing the lower end of the fruit actuated by engagement with the fruit, and severing means operatively connected with the pusher-stem for severing the upper end of the fruit adjacent the said prong while the prong is in the fruit, said parts cooperating to sever the ends of the fruit as the same is being pushed down by the pusher-stem.

13. In a fruit peeling machine, the combination of a frame, a pusher-stem guided to move vertically downward in said frame, having an impaling prong at its forward end for completely supporting the fruit from above, severing means for severing the lower end of the fruit, and severing means for severing the upper end of the fruit adjacent the said prong while the prong is in the fruit and operating to sever the ends of the fruit as the same is pushed down by the pusher stem, and a plurality of peeling knives disposed around the path of the fruit, with means associated with the knives for yieldingly pressing the same inwardly against the cheek of the fruit as it advances, said pusher-stem operating to advance the fruit past the peeling knives without rotation of the fruit and enabling the peeling knives to operate to cut peelings from the same extending longitudinally with the fruit.

14. In a fruit peeling machine, the combination of a frame, a pusher-stem guided to move vertically downward in said frame for advancing the fruit along a path, a pair of end severing knives for severing the end of the fruit, with means for pivotally mounting each knife on the frame so that the knives are opposed to each other, means for yieldingly holding the knives so that they incline upwardly toward their cutting edges and toward the path of the fruit, said knives cooperating when struck by the fruit to swing inwardly and sever the end of the fruit, and operating thereafter to yield and permit the fruit to pass down between the knives.

15. In a fruit peeling machine, the combination of a frame, means mounted on the frame for advancing the fruit along a path, a plurality of pairs of opposed peeler arms pivotally mounted on opposed sides of the path of advance of the fruit, means for positively connecting the pairs of opposed arms, a movably mounted peeling cutter on each arm with a spring connecting the same with its arm for yieldingly pressing the peeling cutter against the fruit, and means for yieldingly urging the arms inwardly toward the path of the fruit.

16. In a fruit peeling machine, the combination of a frame, means mounted on the frame for advancing the fruit along a path, a plurality of pairs of opposed peeler arms pivotally mounted on opposed sides of the path of advance of the fruit, each of the opposed arms having a rigid arm connected therewith, and a connecting link connecting said rigid arms so that the peeler arms can swing inwardly or outwardly in unison, a pivotally mounted peeling cutter on each arm with a spring connected for yieldingly pressing the peeling cutter against the fruit, and means for yieldingly urging the peeler arms inwardly toward the path of the fruit.

17. In a fruit or vegetable peeler, the combination of a frame, a vertically guided pusher-stem mounted in the frame, having an impaling prong at its forward end, and completely supporting the fruit to be peeled, said stem having means for advancing the same in a straight path, a plurality of sets of yieldable peeling members mounted on the frame in the path of the article to be peeled for cutting peelings longitudinally from said article, the sets of peeling members being mounted at spaced points along the path of travel of the article, and the peeling members of each set overlapping the peeling members of the succeeding set to remove the entire peel from the fruit as the fruit passes through said path, said peeling members exerting an upward thrust on the fruit and cooperating with each other to maintain the fruit impaled on the prong, and automatic means mounted on the frame for severing the ends of the fruit as it is being advanced by the pusher-stem.

18. In a fruit peeling machine, the combination of a frame, a pusher-stem guided to move vertically down in said frame, means for normally holding the pusher-stem in an elevated position, said stem having a shoulder at its lower end with an impaling prong projecting beyond the shoulder, said prong operating as the sole support for the fruit impaled thereon against said shoulder, a pair of fruit end severing knives supported in the frame adjacent the prong while the prong is in the fruit, with means for actuating the same when the pusher-stem is depressed to sever the end of the fruit adjacent the prong, another pair of severing knives supported on the frame and cooperating with the fruit when advanced by the pusher-stem, to sever the other end of the fruit, and a plurality of peeling cutters comprising pairs of opposed cutters, with means for yieldingly pressing the peeling cutters against the fruit as it is moved past the same by the pusher-stem.

19. In a fruit peeling machine, the combination of a frame, a pusher stem guided to slide vertically in said frame, said pusher-stem having a shoulder at its forward end with a prong projecting beyond said shoulder, said prong operating as the sole support for the fruit impaled on the same against said shoulder, fruit end severing knives mounted adjacent the prong, means connecting said knives with the pusher stem to actuate the knives when the pusher stem is moved, to sever the end of the fruit adjacent the prong while the prong is in the fruit, fruit end severing knives mounted in the frame below the first-named knives and cooperating with the fruit when advanced by the pusher stem, to sever the other end of the fruit, and peeling cutters supporting the frame beyond the last-named knives and operating to remove the peeling of the fruit as the same is advanced by the pusher-stem.

20. In a device of the class described, the combination of a frame, a spear upon which an article to be peeled is impaled, means for guiding the spear and for advancing the same through a straight path, means mounted in the path of the article and actuated automatically by the advancing spear to remove the butt end from the article as it passes by, a plurality of sets of diametrically opposed spaced peeling members mounted along the path of the article, means movably mounted on the frame for engaging and removing the tip end of the article as it passes, and relatively fixed means extending across the path of the article for splitting the article into halves.

21. In a fruit peeler, the combination of pusher means for advancing the fruit, means connected with the pusher means and actuated by the movement of the pusher means for severing the butt end from the fruit when the pusher means is being advanced, and means located in the path of movement of the fruit and actuated by the pressure of the fruit against it for severing the stem end of the fruit.

22. In a fruit peeling machine, the combination of a frame, means mounted on the frame for advancing the fruit along a path, a pair of opposed peeler arms movably mounted on opposed sides of the path of advance of the fruit, a movably mounted peeling cutter on each arm with a spring connecting the same with its arm for yieldingly pressing the peeling cutter against the fruit, and means for yieldingly urging the arms inwardly toward the path of the fruit.

23. In a fruit peeling machine, the combination of a frame, means mounted on the frame for advancing the fruit along a path, a pair of opposed peeler arms pivotally mounted on opposed sides of the path of advance of the fruit, a movably mounted peeling cutter on each arm with a spring connecting the same with its arm for yieldingly pressing the peeling cutter against the fruit, and means for yieldingly urging the arms inwardly toward the path of the fruit.

24. In a fruit peeling machine, the combination of a frame, means mounted on the frame for holding a fruit to be peeled, a pair of opposed peeler arms movably mounted on opposed sides of the fruit, means for imparting relative movement between the peeling arms and the fruit along a path longitudinally of the fruit, a movably mounted peeling cutter on each arm with a spring connecting the same with its arm for yieldingly pressing the peeling cutter against the fruit, and means for yieldingly urging the arms inwardly toward the path of the fruit.

ALBERT R. THOMPSON.